US010871122B1

(12) United States Patent
Campion et al.

(10) Patent No.: US 10,871,122 B1
(45) Date of Patent: Dec. 22, 2020

(54) FUEL INJECTOR MONITORING

(71) Applicant: Caterpillar Inc., Peoria, IL (US)

(72) Inventors: Robert M. Campion, Chillicothe, IL (US); Hoisan Kim, Dunlap, IL (US); Kenth I. Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/584,558

(22) Filed: Sep. 26, 2019

(51) Int. Cl.
*F02D 41/40* (2006.01)
*F02M 61/16* (2006.01)
*F02M 55/00* (2006.01)
*F02M 61/18* (2006.01)
*B33Y 80/00* (2015.01)
*F02M 57/00* (2006.01)

(52) U.S. Cl.
CPC ............ *F02D 41/401* (2013.01); *B33Y 80/00* (2014.12); *F02M 55/008* (2013.01); *F02M 57/005* (2013.01); *F02M 61/166* (2013.01); *F02M 61/168* (2013.01); *F02M 61/1893* (2013.01); *F02D 2200/0602* (2013.01); *F02D 2200/0618* (2013.01); *F02M 2200/21* (2013.01); *F02M 2200/247* (2013.01); *F02M 2200/9007* (2013.01)

(58) Field of Classification Search
CPC ........... F02D 41/401; F02D 2200/0602; F02D 2200/0618; B33Y 80/00; F02M 57/005; F02M 61/1893; F02M 61/166; F02M 61/168; F02M 2200/21; F02M 2200/9007; F02M 2200/247; F02M 55/008
USPC ........................................ 123/490, 498, 499
See application file for complete search history.

(56) References Cited

U.S. PATENT DOCUMENTS

| 6,345,606 | B1 | 2/2002 | Ricci-Ottati et al. |
| 7,140,353 | B1 | 11/2006 | Rauznitz et al. |
| 7,665,445 | B2 | 2/2010 | Venkataraghavan et al. |
| 8,100,344 | B2 | 1/2012 | Kondo et al. |
| 8,297,259 | B2 | 10/2012 | Kondo et al. |
| 8,543,314 | B2 * | 9/2013 | Nakata ............... F02M 37/0041 701/103 |
| 10,247,112 | B2 | 4/2019 | Wickstone et al. |
| 2016/0016369 | A1 | 1/2016 | Tarbutton et al. |
| 2019/0054659 | A1 | 2/2019 | Tseng et al. |

FOREIGN PATENT DOCUMENTS

WO 2018085936 A1 5/2018

OTHER PUBLICATIONS

Rauer et al., "Intelligent Injectors—Digitization in the Injection Technology of Large Engines," MTZ Worldwide, Issue Jun. 2019, pp. 58-65.

* cited by examiner

*Primary Examiner* — Hai H Huynh
(74) *Attorney, Agent, or Firm* — Harrity & Harrity LLP

(57) ABSTRACT

A fuel system is disclosed. The fuel system may include at least one fuel injector, the at least one fuel injector having an injector body and one or more piezoelectric sensors located in the injector body. The fuel system may include a controller configured to: obtain, from the one or more piezoelectric sensors, one or more pressure measurements associated with a fuel injection process; determine a timing of the fuel injection process based on the one or more pressure measurements; determine an adjustment to the timing based on a comparison of the timing to a reference timing; and adjust the timing of the fuel injection process based on the determined adjustment.

13 Claims, 3 Drawing Sheets

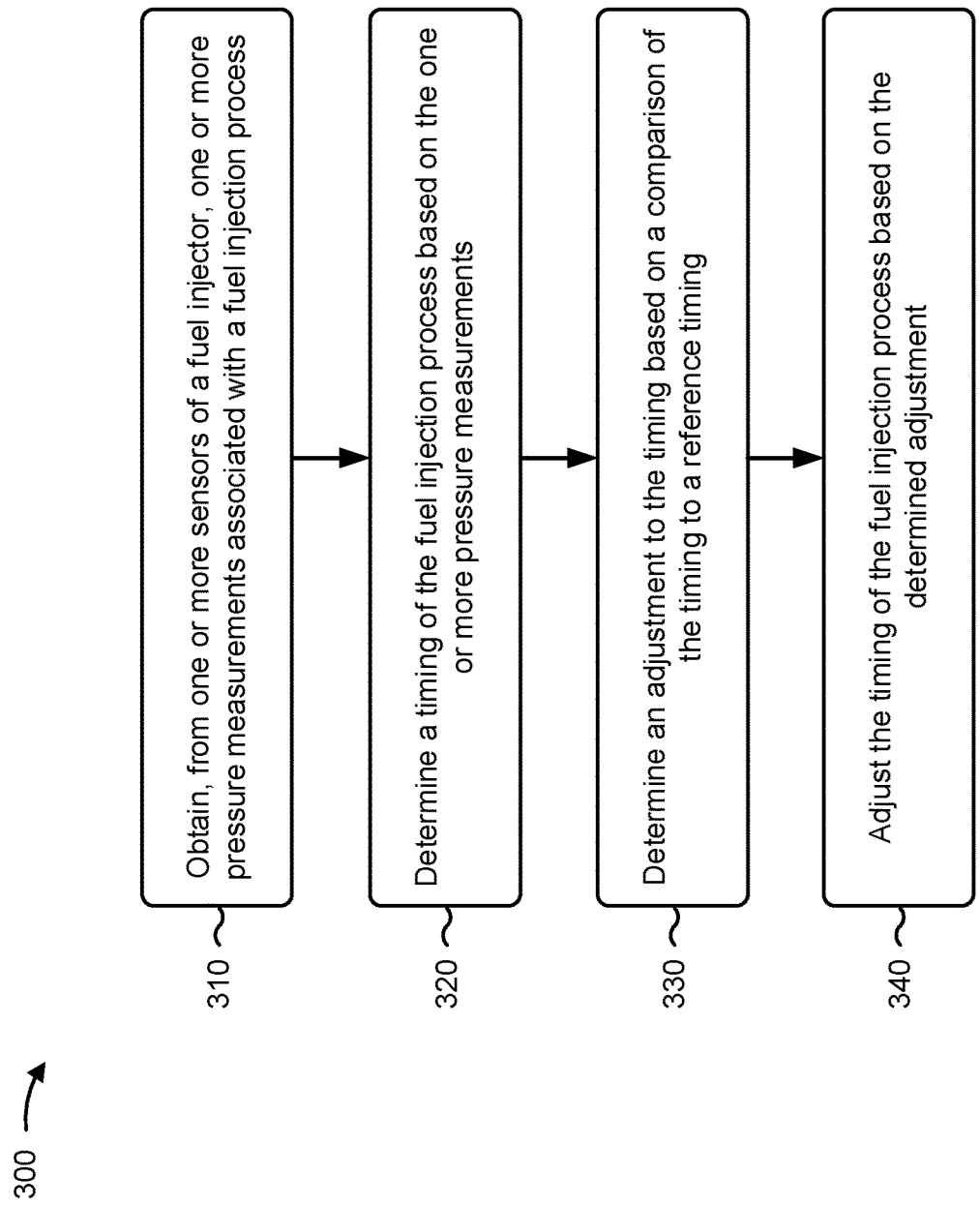

FUEL INJECTOR MONITORING

TECHNICAL FIELD

The present disclosure relates generally to fuel injectors and, for example, to fuel injector monitoring.

BACKGROUND

Internal combustion engines use fuel injectors to deliver fuel under pressure to one or more cylinders. Fuel injectors may be operated by a controller to deliver measured quantities of fuel to the cylinders in a particular timing according to a movement of pistons within the cylinders. The timing of fuel injection and the quantity of fuel injected during each injection operation may affect the performance and the emissions of the engine.

For example, components of a fuel injector may wear over time, which may affect the timing of fuel injection and/or the quantity of fuel injected by the fuel injector. This may result in variations within a set of fuel injectors and/or a deviation from a fuel injector's initial configuration. Accordingly, performance and emissions of the engine may change over time due to wear of one or more fuel injectors.

One attempt at a fuel injection system for controlling fuel pressure is disclosed in U.S. Pat. No. 6,345,606 that issued to Ricci-Ottati et al. on Feb. 12, 2002 ("the '606 patent"). In particular, the '606 patent discloses a fuel injection system that includes at least one fuel injector having an axially extending fuel passage therein, a control chamber disposed in the injector, an injector valve axially movable within the fuel passage in accordance with a fuel pressure in the control chamber, a control valve for controlling fuel pressure in the control chamber, and a piezoelectric actuator for actuating the control valve. The '606 patent discloses that the fuel injection system further includes a pressure sensor for determining a rail pressure in the common rail, and a controller electrically connected to the pressure sensor and to the piezoelectric actuator of at least one fuel injector. The '606 patent indicates that in response to a signal from the pressure sensor, the controller actuates the control valve such that the control chamber relieves pressure through a low pressure fuel return circuit without axially moving the injector valve within the injector body, thereby controlling fuel pressure in the system.

While the fuel injector system of the '606 patent may utilize a pressure sensor in controlling fuel pressure in the system, the '606 patent does not disclose that the pressure sensor may be used by the fuel injector system to obtain one or more measurements that indicate a timing of a fuel injection process of a fuel injector. As described above, a timing of a fuel injection process associated with a fuel injector may change as the fuel injector wears, thereby affecting engine performance and emissions.

The fuel system of the present disclosure solves one or more of the problems set forth above and/or other problems in the art.

SUMMARY

According to some implementations, a fuel system may include at least one fuel injector, the at least one fuel injector having an injector body and one or more piezoelectric sensors located in the injector body; and a controller configured to: obtain, from the one or more piezoelectric sensors, one or more pressure measurements associated with a fuel injection process; determine a timing of the fuel injection process based on the one or more pressure measurements; determine an adjustment to the timing based on a comparison of the timing to a reference timing; and adjust the timing of the fuel injection process based on the determined adjustment.

According to some implementations, a method may include forming, by additive manufacturing, a piezoelectric sensor integrally in a component for a fuel injector; and assembling the component in the fuel injector such that the piezoelectric sensor is in association with a fluid passageway in the fuel injector having a fluid pressure therein that varies in response to operating the fuel injector.

According to some implementations, a method may include obtaining, from one or more sensors of a fuel injector, one or more pressure measurements associated with a fuel injection process; determining a timing of the fuel injection process based on the one or more pressure measurements; determining an adjustment to the timing based on a comparison of the timing to a reference timing; and adjusting the timing of the fuel injection process based on the determined adjustment.

BRIEF DESCRIPTION OF THE DRAWINGS

FIG. 3 is a diagram of an example process for fuel injector monitoring.

DETAILED DESCRIPTION

This disclosure relates to a fuel injector. The fuel injector has universal applicability to any machine utilizing an internal combustion engine. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, a locomotive, a generator, or other above ground equipment, underground equipment, or marine equipment.

Figure 1:
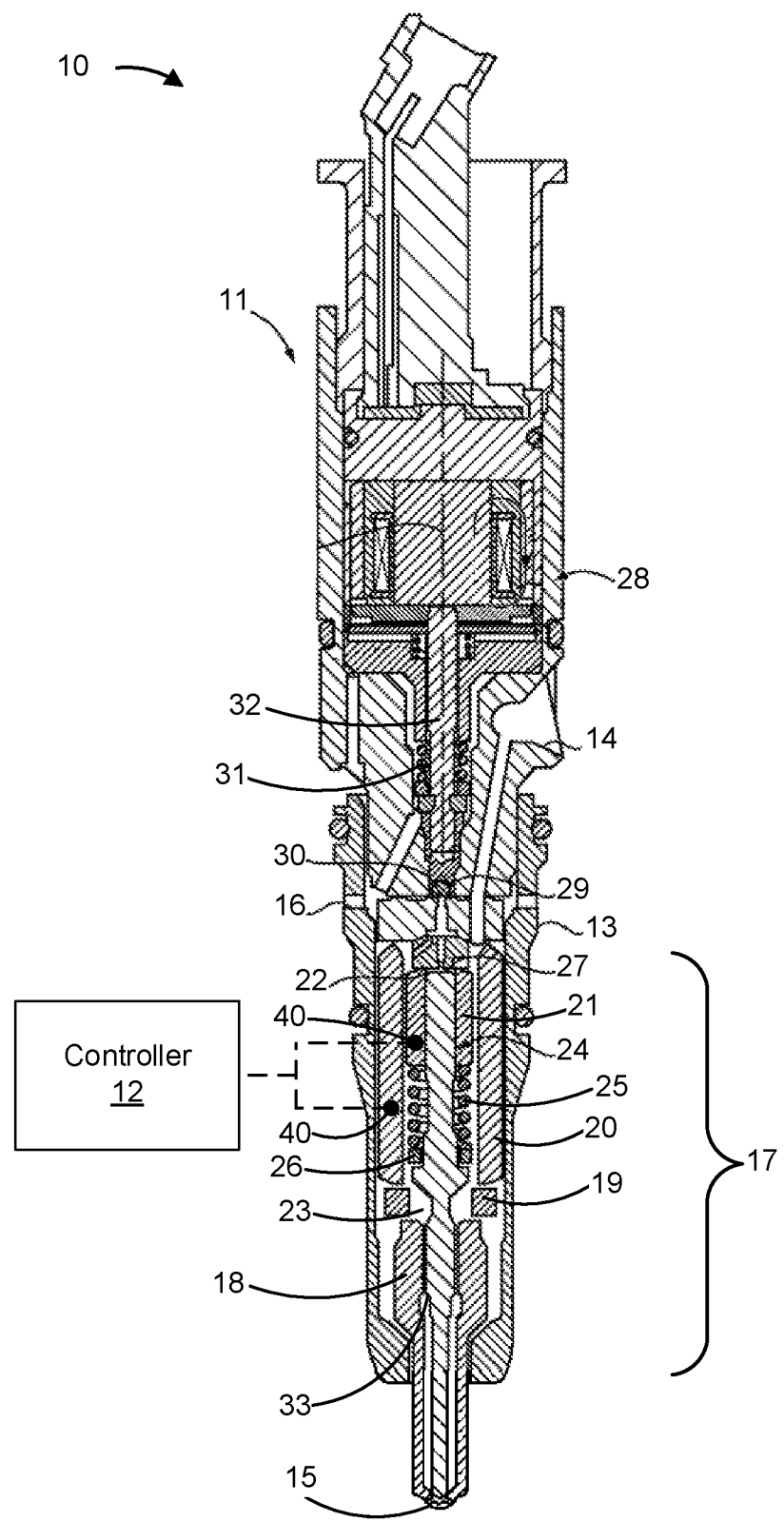
FIGS. 1 and 2 are diagrams of example fuel systems.

FIG. 1 is a diagram of an example fuel system 10 that includes a fuel injector 11 and a controller 12 (e.g., an engine control module). In some aspects, the fuel system 10 may include multiple fuel injectors 11. For example, each fuel injector 11 of the fuel system 10 may inject fuel into a respective cylinder of an engine during a respective fuel injection event. In some aspects, the fuel system 10 also may include a fuel conduit (not shown), such as a common rail, that supplies fuel to the fuel injector 11 and a fuel pump (not shown) that supplies fuel to the fuel conduit from a fuel reservoir (not shown). The fuel injector 11 is shown as a common rail fuel injector, however the fuel injector 11 may be a different type of fuel injector in some aspects.

The fuel injector 11 may include an injector body 13 that defines a fuel inlet 14, a nozzle outlet 15, and a drain outlet 16. The fuel injector 11 may include an injector stack 17 located in the injector body 13. The injector stack 17 may include a plurality of components of the fuel injector 11 that are stacked and sealed within the injector body 13 during assembly of the fuel injector 11. For example, the injector stack 17 may include a nozzle tip component 18, a spacer component 19, and a high-pressure containment sleeve 20. In some aspects, a needle sleeve 21 may be disposed in the high-pressure containment sleeve 20. The components of the injector stack 17 may define a needle control chamber 22 associated with a fuel passageway 23, in which a nozzle check valve 24 is movably positioned. A nozzle spring 25 may bias the nozzle check valve 24 to a closed position relative to the nozzle outlet 15. A nozzle spring spacer 26 may set a preload on the nozzle spring 25.

The nozzle outlet 15 is controlled (e.g., opened and closed) by the nozzle check valve 24, by relieving or applying pressure to a closing hydraulic surface 27 that is located in the needle control chamber 22. The fuel injector 11 may include a solenoid actuator 28 that controls movement of a control valve 29 with respect to a flat valve seat 30. When the solenoid actuator 28 is de-energized, a biasing spring 31 causes a pin 32 to push control valve 29 downward into contact with the flat valve seat 30. When the solenoid actuator 28 is energized, the pin 32 moves upward to allow the control valve 29 to move out of contact with the flat valve seat 30 to fluidly connect the needle control chamber 22 to the drain outlet 16. When this occurs, pressure acting on the closing hydraulic surface 27 drops, and the nozzle check valve 24 lifts to an open position responsive to continuous high fuel pressure on an opening hydraulic surface 33 to commence a fuel injection event.

The fuel injector 11 may include one or more sensors 40 in the injector body 13. The one or more sensors 40 may be associated with a component of the fuel injector 11 that is configured for movement and/or a component of the fuel injector 11 that is adjacent the component configured for movement or adjacent a passageway of the fuel injector 11 configured for fluid movement. For example, the one or more sensors 40 may be located in the injector stack 17 of the injector body 13. As an example, a sensor 40 may be associated with a sleeve, such as a component of the injector stack 17 (e.g., the nozzle tip component 18, the spacer component 19, the high-pressure containment sleeve 20, the needle sleeve 21, and/or the nozzle spring spacer 26). Additionally, or alternatively, a sensor 40 may be associated with a fluid passageway of the fuel injector 11 (e.g., in the fluid passageway or on a surface adjacent the fluid passageway, such as a sleeve associated with the fluid passageway), such as the fuel passageway 23.

A sensor 40 may be a piezoelectric sensor or a strain gauge sensor. In some implementations, the sensor 40 may be manufactured by additive manufacturing. For example, a piezoelectric sensor may be formed by an additive manufacturing process that uses a piezoelectric material (e.g., a crystalline material and/or a ceramic material). The sensor 40 may be affixed (e.g., by an adhesive) to a component (e.g., a sleeve or a spacer) of the fuel injector 11, such as a component of the injector stack 17 (e.g., the nozzle tip component 18, the spacer component 19, the high-pressure containment sleeve 20, the needle sleeve 21, and/or the nozzle spring spacer 26).

Alternatively, a component (e.g., a sleeve or a spacer) of the fuel injector 11, such as a component of the injector stack 17, may be formed by additive manufacturing to include a sensor (e.g., a piezoelectric sensor). For example, a component (e.g., a sleeve or a spacer) of the fuel injector 11, such as a component of the injector stack 17 (e.g., the nozzle tip component 18, the spacer component 19, the high-pressure containment sleeve 20, the needle sleeve 21, and/or the nozzle spring spacer 26), and a sensor 40 (e.g., a piezoelectric sensor), may be formed by additive manufacturing as a single component (e.g., the sensor 40 may be formed integrally in the component). As another example, a component (e.g., a sleeve or a spacer) of the fuel injector 11, such as a component of the injector stack 17 (e.g., the nozzle tip component 18, the spacer component 19, the high-pressure containment sleeve 20, the needle sleeve 21, and/or the nozzle spring spacer 26), may be formed of a piezoelectric material by additive manufacturing such that the component is a piezoelectric sensor. In some implementations, a component of the fuel injector 11 may be formed by additive manufacturing so as to include a portion of a fluid passageway (e.g., fuel passageway 23) of the fuel injector 11.

One or more components of the fuel injector 11 (e.g., components of the injector stack 17) that include, or embody, a sensor 40 (e.g., a piezoelectric sensor) may be assembled (e.g., positioned or arranged) in the injector body 13 in a conventional manner to produce the fuel injector 11. For example, one or more components that include, or embody, a sensor 40 may be assembled in the injector body 13 such that the sensor 40 is in association with a fluid passageway of the fuel injector 11 (e.g., a fluid passageway in the fuel injector 11 having a fluid pressure therein that varies in response to operating the fuel injector 11).

The one or more sensors 40 (e.g., one or more piezoelectric sensors) may be configured to obtain one or more measurements that indicate a timing of a fuel injection process of the fuel injector 11 (e.g., a process of the fuel injector 11, as described above, that causes a fuel injection event). Moreover, the one or more sensors 40 may provide signals to the controller 12 that indicate the timing of the fuel injection event. The one or more sensors 40 may communicate with the controller 12 via a wired connection or a wireless connection. Thus, in some implementations, the injector body 13 may include one or more apertures for wiring between the one or more sensors 40 and the controller 12.

The controller 12 may obtain, from the one or more sensors 40, one or more measurements that indicate a timing of a fuel injection process of the fuel injector 11. For example, the controller 12 may obtain one or more pressure measurements (e.g., one or more pressure measurements relating to a change in pressure) from the one or more sensors 40. A pressure measurement may relate to fuel pressure in the fuel passageway 23. Additionally, or alternatively, a pressure measurement may relate to acoustic pressure caused by movement of the control valve 29 and/or the nozzle check valve 24. For example, a movement of the control valve 29 and/or the nozzle check valve 24 may produce acoustic pressure (e.g., sound) that may be detected by the one or more sensors 40. In some implementations, the one or more measurements may further indicate an amount of fuel injected by the fuel injection process (e.g., based on a degree of pressure, based on a degree of change in pressure, based on a duration associated with the timing of the fuel injection process, and/or the like).

The controller 12 may determine a timing of the fuel injection process based on the one or more measurements (e.g., based on respective measurement times associated with the one or more measurements). That is, the controller 12 may determine an initiation time of the fuel injection process and a completion time of the fuel injection process based on the one or more measurements (e.g., based on a change in pressure indicated by the one or more measurements). For example, based on detecting a particular fuel pressure, or a particular change in fuel pressure, in the fuel passageway 23, the controller 12 may determine that the fuel injection process has been initiated or completed. As another example, based on detecting a particular acoustic pressure (e.g., a particular audio signature associated with a particular movement of the control valve 29 and/or the nozzle check valve 24) or a particular change in acoustic pressure, the controller 12 may determine that the fuel injection process has been initiated or completed.

The controller 12 may determine whether to adjust the timing of the fuel injection process based on a comparison of the timing to a reference timing. The reference timing may be associated with a reference fuel injection event of a reference fuel injector. The reference fuel injector may be the fuel injector 11 prior to any wear (e.g., prior to use in an engine), may be another fuel injector in a set with fuel injector 11, may be another fuel injector that is used as a reference, and/or the like.

The controller 12 may determine an adjustment to the timing of the fuel injection process based on the comparison of the timing to the reference timing. For example, the controller 12 may determine an adjustment to an initiation timing (e.g., when a control signal that initiates a fuel injection process is provided to the fuel injector 11), or an adjustment to a termination timing (e.g., when a control signal that terminates a fuel injection process is provided to the fuel injector 11). The controller 12 may determine the adjustment such that an adjusted timing (i.e., the timing adjusted by the adjustment) corresponds to the reference timing. The adjusted timing may correspond to the reference timing when the adjusted timing matches, or is within a threshold percentage and/or a threshold time of, the reference timing. Additionally, or alternatively, the adjusted timing may correspond to the reference timing when the adjusted timing corresponds to one or more crank angles that are within a threshold value of one or more crank angles corresponding to the reference timing.

The controller 12 may adjust a timing of the fuel injection process (e.g., in relation to a subsequent fuel injection event) according to the determined adjustment. For example, the controller 12 may adjust the timing of the fuel injection process such that the timing of the fuel injection process corresponds to the reference timing. Such adjusting may occur in real time (e.g., the adjusting may apply to a next fuel injection event) or in near-real time (e.g., the adjusting may apply within a threshold quantity of subsequent injection events).

As indicated above, FIG. 1 is provided as an example. Other examples may differ from what was described in connection with FIG. 1.

Figure 2:
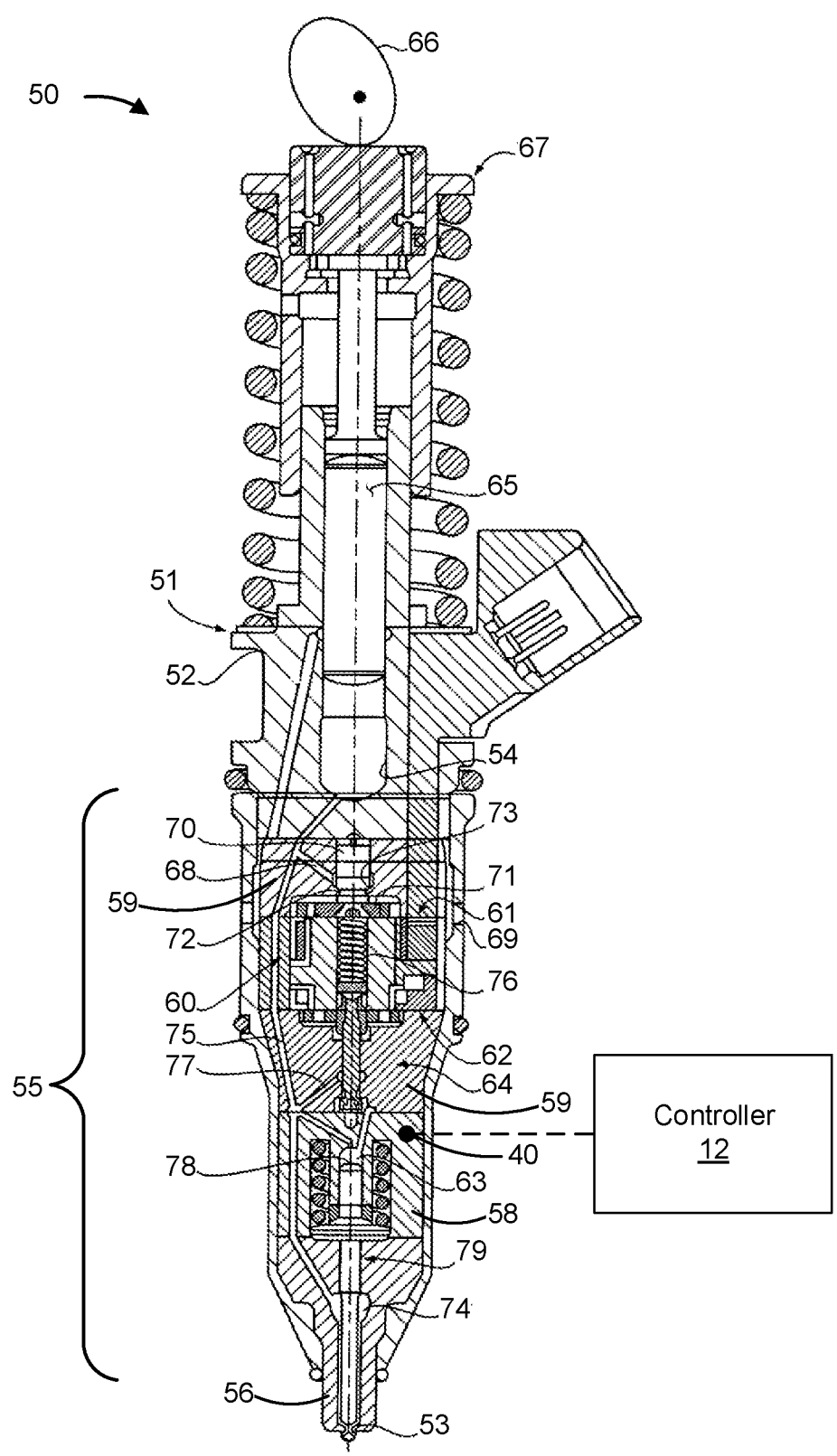

FIG. 2 is a diagram of an example fuel system 50 that includes a fuel injector 51 and the controller 12. In some aspects, the fuel system 50 may include multiple fuel injectors 51. For example, each fuel injector 51 of the fuel system 50 may inject fuel into a respective cylinder of an engine during a respective fuel injection event. In some aspects, the fuel system 50 also may include a fuel conduit (not shown) that supplies fuel to the fuel injector 51, and a fuel pump (not shown) that supplies fuel to the fuel conduit from a fuel reservoir (not shown). The fuel injector 51 is shown as a mechanical unit fuel injector, however the fuel injector 51 may be a different type of fuel injector in some aspects.

The fuel injector 51 may include an injector body 52 that defines a nozzle outlet 53 and a pumping chamber 54. The fuel injector 51 may include an injector stack 55 located in the injector body 52. The injector stack 55 may include a nozzle tip component 56, a spring spacer 58, and a control valve assembly body 59.

The control valve assembly body 59 may house a control valve assembly that includes a first solenoid actuator 60 operably coupled to a spill valve 61, and a second solenoid actuator 62 operably coupled to control pressure in a needle control chamber 63 via a needle control valve 64. When a plunger 65 is driven downward due to rotation of a cam 66 acting on a tappet 67, fuel is displaced from the pumping chamber 54 into a spill passage 68, past the spill valve 61, and out a drain passage (not shown) that is fluidly connected to a fuel supply/return opening 69.

When the first solenoid actuator 60 is energized, a spill valve member 70 is moved with an armature 71 until a valve surface 72 comes in contact with an annular valve seat 73 to close the spill passage 68. When this occurs, fuel pressure in the pumping chamber 54 increases, as well as a fuel pressure in a nozzle chamber 74 via the fluid connection provided by a fuel passageway 75. The spill valve member 70 may be biased to a fully open position via a biasing spring 76. The biasing spring 76 also serves to bias the needle control valve 64 to a configuration that fluidly connects the needle control chamber 63 to a pressure connection passage 77, which is fluidly connected to the fuel passageway 75.

Pressure in the needle control chamber 63 acts upon a closing hydraulic surface 78 associated with a nozzle check valve 79. When pressure in the needle control chamber 63 is high, the nozzle check valve 79 will remain in, or move toward, a closed position blocking the nozzle outlet 53. When the second solenoid actuator 62 is energized, the needle control valve 64 moves to a position that blocks the pressure connection passage 77, and instead fluidly connects the needle control chamber 63 to the fuel supply/return opening 69 via a low pressure passage (not shown). When pressure in the needle control chamber 63 is low and pressure in the nozzle chamber 74 is above a valve opening pressure (VOP) of the nozzle check valve 79, the nozzle check valve 79 will lift to an open position to commence a fuel injection event.

The fuel injector 51 may include one or more sensors 40 (e.g., one or more piezoelectric sensors) in the injector body 52, as described in more detail above in connection with FIG. 1. For example, a sensor 40 may be associated with a component (e.g., a sleeve or a spacer) of the fuel injector 51, such as a component of the injector stack 55 (e.g., the nozzle tip component 56, the spring spacer 58, and/or the control valve assembly body 59), or a fluid passageway, such as the fuel passageway 75. Moreover, the one or more sensors 40 may be configured to obtain one or more measurements that indicate a timing of a fuel injection process of the fuel injector 51, as described in more detail above in connection with FIG. 1.

Furthermore, the controller 12 may be configured to obtain one or more measurements that indicate a timing of a fuel injection process of the fuel injector 51 (e.g., a process of the fuel injector 51, as described above, that causes a fuel injection event), determine a timing of the fuel injection process based on the one or more measurements, determine an adjustment to the timing of the fuel injection process based on the comparison of the timing to the reference timing, and adjust a timing of the fuel injection process according to the determined adjustment, as described in more detail above in connection with FIG. 1. For example, the one or more measurements may be pressure measurements relating to a fuel pressure in the fuel passageway 75 or an acoustic pressure caused by movement of a control valve (e.g., the needle control valve 64 or the spill valve member 70) and/or the nozzle check valve 79, as described in more detail above in connection with FIG. 1.

As indicated above, FIG. 2 is provided as an example. Other examples may differ from what was described in connection with FIG. 2.

FIG. 3 is a flow chart of an example process 300 for fuel injector monitoring. In some implementations, one or more process blocks of FIG. 3 may be performed by a controller (e.g., the controller 12 and/or the like). One or more process blocks of FIG. 3 may be performed by another device or a group of devices separate from or including the controller.

As shown in FIG. 3, process 300 may include obtaining, from one or more sensors (e.g., one or more piezoelectric sensors) of a fuel injector, one or more pressure measurements associated with a fuel injection process (block 310). For example, the controller (e.g., using a processor, a memory, a storage component, an input component, a communication interface, and/or the like) may obtain, from one or more sensors of a fuel injector, one or more pressure measurements associated with a fuel injection process, as described above.

The one or more sensors may have been formed by additive manufacturing using a piezoelectric material. The one or more pressure measurements may relate to fuel pressure in a fuel passageway of the fuel injector. Additionally, or alternatively, the one or more pressure measurements may relate to acoustic pressure caused by movement of a control valve of the fuel injector. Additionally, or alternatively, the one or more pressure measurements may relate to acoustic pressure caused by movement of a nozzle check valve of the fuel injector.

As further shown in FIG. 3, process 300 may include determining a timing of the fuel injection process based on the one or more pressure measurements (block 320). For example, the controller (e.g., using a processor, a memory, and/or the like) may determine a timing of the fuel injection process based on the one or more pressure measurements, as described above. The timing of the fuel injection process may be determined based on respective measurement times associated with the one or more pressure measurements.

As further shown in FIG. 3, process 300 may include determining an adjustment to the timing based on a comparison of the timing to a reference timing (block 330). For example, the controller (e.g., using a processor, a memory, and/or the like) may determine an adjustment to the timing based on a comparison of the timing to a reference timing, as described above. The reference timing may be associated with a reference fuel injection process of a reference fuel injector.

As further shown in FIG. 3, process 300 may include adjusting the timing of the fuel injection process based on the adjustment (block 340). For example, the controller (e.g., using a processor, a memory, a storage component, and/or the like) may adjust the timing of the fuel injection process based on the adjustment, as described above.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed fuel system may be used with any machine employing one or more fuel injectors that, over time, may wear. For example, over time, internal structures of a fuel injector, such as a fuel passageway, a control valve, a nozzle check valve, and/or the like, may wear due to repeated use. As a result, a timing of a fuel injection process associated with the fuel injector may diverge from an expected timing. The disclosed fuel system may be used to adjust a timing of a fuel injection process associated with a worn fuel injector. For example, the disclosed fuel system may employ a fuel injector having one or more components that include one or more piezoelectric sensors, formed, for example, by additive manufacturing. The one or more piezoelectric sensors may be configured to collect pressure measurements that provide an indication of a timing of a fuel injection process of the fuel injector.

In this way, adjustments to the timing may be made (e.g., in real time or near-real time) to maintain correspondence between the timing and a reference timing. Accordingly, the disclosed fuel system permits a timing of an individual fuel injector to be kept within a particular tolerance, and permits timings among a set of fuel injectors to be synchronized, thereby improving engine performance and emissions.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A fuel system, comprising:
   at least one fuel injector,
      the at least one fuel injector having an injector body and one or more piezoelectric sensors located in the injector body; and
   a controller configured to:
      obtain, from the one or more piezoelectric sensors, one or more pressure measurements associated with a fuel injection process;
      determine a timing of the fuel injection process based on the one or more pressure measurements;
      determine an adjustment to the timing based on a comparison of the timing to a reference timing; and
      adjust the timing of the fuel injection process based on the determined adjustment.

2. The fuel system of claim 1, wherein the one or more pressure measurements relate to fuel pressure in a fuel passageway of the fuel injector.

3. The fuel system of claim 1, wherein the one or more pressure measurements relate to acoustic pressure caused by movement of a control valve of the fuel injector.

4. The fuel system of claim 1, wherein the one or more pressure measurements relate to acoustic pressure caused by movement of a nozzle check valve of the fuel injector.

5. The fuel system of claim 1, wherein the one or more piezoelectric sensors are associated with a sleeve located in the injector body.

6. The fuel system of claim 1, wherein the reference timing is associated with a reference fuel injection process of a reference fuel injector.

7. A method, comprising:
   obtaining, from one or more sensors of a fuel injector, one or more pressure measurements associated with a fuel injection process;
   determining a timing of the fuel injection process based on the one or more pressure measurements;
   determining an adjustment to the timing based on a comparison of the timing to a reference timing; and
   adjusting the timing of the fuel injection process based on the determined adjustment.

8. The method of claim 7, wherein the one or more sensors have been formed by additive manufacturing using a piezoelectric material.

9. The method of claim 7, wherein the one or more pressure measurements relate to fuel pressure in a fuel passageway of the fuel injector.

10. The method of claim 7, wherein the one or more pressure measurements relate to acoustic pressure caused by movement of a control valve of the fuel injector.

11. The method of claim 7, wherein the one or more pressure measurements relate to acoustic pressure caused by movement of a nozzle check valve of the fuel injector.

12. The method of claim 7, wherein the timing of the fuel injection process is determined based on respective measurement times associated with the one or more pressure measurements.

13. The method of claim 7, wherein the reference timing is associated with a reference fuel injection process of a reference fuel injector.

\* \* \* \* \*